Oct. 11, 1960 CHAANG HUANG 2,956,241
COMPLEMENTARY TRANSISTOR MULTIVIBRATOR
Filed Dec. 27, 1955
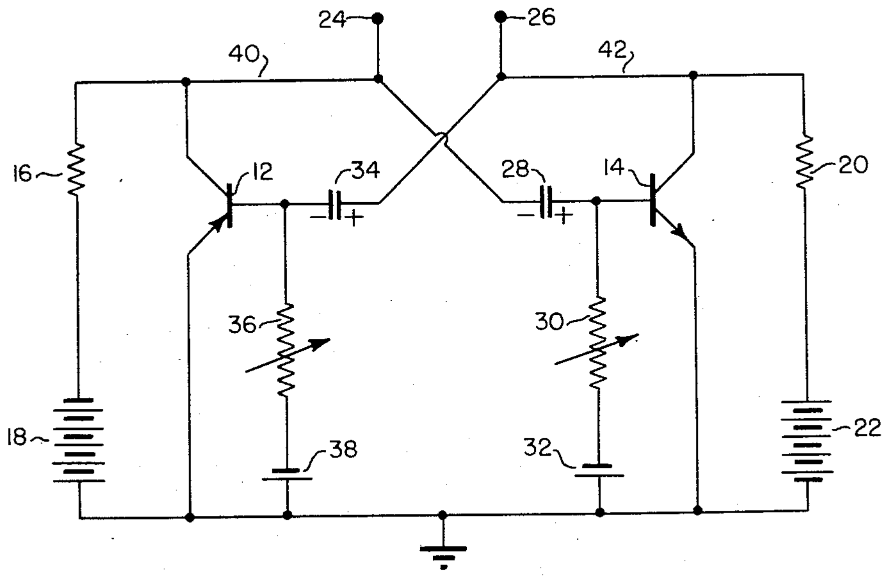
INVENTOR.
CHAANG HUANG
BY Elmer J. Nealon
ATTORNEY

United States Patent Office 2,956,241

Patented Oct. 11, 1960

2,956,241

COMPLEMENTARY TRANSISTOR MULTIVIBRATOR

Chaang Huang, Watertown, Mass.

Filed Dec. 27, 1955, Ser. No. 555,650

3 Claims. (Cl. 331—113)

The present invention relates generally to multivibrators, and more particularly to a free-running multivibrator consisting of a pair of transistor stages having mutual feedback paths.

In my copending application filed jointly with Benjamin H. White, Serial No. 526,157, filed August 3, 1955, there is disclosed a bistable circuit of symmetrical configuration which includes a pair of transistors of complementary type, that is, one being a p-n-p type and the other an n-p-n type. A modification of this structure is also shown whereby a monostable circuit is provided by direct current decoupling of the transistors through their mutual feedback paths. In either of the embodiments of said application, the output of the circuit is ordinarily derived from two designated output terminals, or from the potential between either of said terminals and the circuit ground connection. A characteristic of both embodiments, by which they are readily distinguished from many analogous circuits in the prior art, is that the transistors attain their "on," or high conduction, and "off," or low conduction, states substantially in unison rather than alternately.

It is an object of the present invention to provide a modification of the basic circuit described in said application to render it astable, whereby the circuit becomes a free-running multivibrator.

A feature of this invention resides in the provision of such a multivibrator which consists of a pair of complementary transistors arranged in a symmetrical circuit, with mutual feedback paths including condensers for direct current decoupling.

Another feature resides in the inclusion of direct current bias means to bias one of the transistors to a high conduction or "on" state, and the other transistor to a low conduction or "off" state.

Still another feature resides in the adaptability of the circuit to adjustment of the "duty cycle," i.e., the relation of the length of the high conduction state relative to the low conduction state of the transistors.

Another feature resides in the provision of such a circuit having outputs as in said application, namely, either between two terminals having potentials varying inversely with respect to the circuit ground as a function of time, or between either of said terminals and ground.

Other features reside in the details of the circuit and in the arrangements and relationships of the components thereof, as will be readily understood from the following description of a preferred embodiment, and from the appended drawing illustrating the same.

Referring to the drawing, I provide a p-n-p transistor 12 and an n-p-n transistor 14. Each transistor is illustrated according to the conventional symbol, the arrows designating the emitters being directed reversely with respect to the bases, thereby indicating that the transistors are of complementary type. The emitters are connected in common with the circuit ground.

The transistor 12 has a collector circuit completed through a resistor 16 and a direct current source 18, illustrated in this case by a battery. (It is obvious that other forms of direct current sources may be substituted for the battery 18, such as conventional rectifier/filter combinations.) Similarly, the transistor 14 has a collector circuit completed through a resistor 20 and a battery 22. The values of the batteries 18 and 22 are selected in accordance with the amplitudes of the square-wave pulses to be derived from the circuit. The output is ordinarily derived from a pair of terminals 24 and 26. By reason of a characteristic of the circuit hereinafter more fully explained, the transistors reach their high-conduction and low-conduction states substantially simultaneously, whereby a full cycle of the multivibrator comprises a period of low conduction in both transistors, followed by a period of high conduction in both transistors. In the period of low conduction the terminal 24 reaches a potential which is negative with respect to the circuit ground by substantially the value of the battery 18, and the terminal 26 reaches a potential which is positive with respect to ground by substantially the value of the battery 22. In the following period of high conduction the potentials of the terminals 24 and 26 reach values close to ground. In a typical application the batteries 18 and 22 have equal voltages.

The feedback path from the transistor 12 to the transistor 14 consists of a condenser 28 connected between the collector of the transistor 12 and the base of the transistor 14, a variable resistor 30, and a bias battery 32 connected in the proper polarity to bias the base-emitter circuit of the transistor 14 to the "off" state. The feedback circuit from the transistor 14 to the transistor 12 includes a condenser 34, a variable resistor 36, and a bias battery 38 connected in the proper polarity to bias the base emitter circuit of the transistor 12 to the "on" state. As will be appreciated from the following description, the circuit may also be operated by reversing both of the batteries 32 and 38, in which case the transistor 14 is biased "on" and the transistor 12 is biased "off."

The operation of the circuit may be understood by first assuming a momentary condition in which transistor 14 is not conductive by reason of its initial "biased-off" condition, while the transistor 12 has an appreciable collector current. This current remains steady for a sufficient time to permit any current in the resistor 30 and condenser 28, connected between ground and a lead 40, to reach a low value. By reason of the polarity of the battery 32, this results ultimately in preventing current flow in the collector circuit of the transistor 14. The emitter-to-collector impedance of the transistor 12 is much less than the impedance of the resistor 16, and therefore the voltage drop across the latter resistor approaches the voltage of the battery 18, thus causing the potential of the lead 40 to approach that of ground. With transistor 14 "off," no current is flowing through the resistor 20 and the potential of a lead 42 becomes positive with respect to ground by the voltage of the battery 22. Consequently, the condenser 34 begins to charge to a voltage equal to the sum of the voltages of the batteries 22 and 38 and with the polarity indicated in the drawing.

The foregoing conditions are transient since the circuit is intentionally designed to operate as a free-running multivibrator. For a reason that will be evident from the following description, a short, positive pulse is immediately applied to the base of the transistor 12, and its emitter-base current and emitter-collector current are forthwith stopped. This causes the potential of the lead 40 to become momentarily negative by a value equal to that of the battery 18, which further results in a current flowing through the resistor 30 in such a direction that the voltage drop across this resistor makes the potential of the base of the transistor 14 even more negative than formerly, thereby sustaining the non-conduction state of this transistor. This same current changes up the condenser 28 with the polarity indicated in the drawing, so that when the input pulse is removed and the transistor 12 resumes conduction with the lead 40 returning to a potential near ground, the condenser 28 discharges through the resistor 30 to create a voltage thereacross in the appropriate polarity to cause conduction in the emitter-base circuit of the transistor 14.

The resulting collector current flowing in the resistor 20 due to the emitter-base current in the transitor 14 causes the potential of the lead 42 to reach a value approaching ground. This results in the condenser 34 discharging through the resistor 36 in such a direction as to make the base of the transistor 12 more negative, thereby sustaining current flow in the transistor 12 collector circuit. By this means the circuit is returned to the transitory state originally assumed, which gives rise to a positive pulse at the base of the transistor 12 as previously mentioned. This pulse arises from the fact that when the capacitor 28 has substantially discharged through the resistor 30, the base potential of the transistor 14 once again resumes its negative bias value, and this transistor ceases to conduct. When this happens the capacitor 34 again charges up in the polarity indicated in the drawing, thus producing a voltage drop across the resistor 36 which makes the base of the transistor 12 positive with respect to ground. The positive pulse on the base of the transistor 12 shuts off current in this transistor, and the cycle repeats itself as above described.

It will be observed that one of the features of the foregoing circuit, as in said copending application, is that the transistors are turned "on" and "off" substantially simultaneously, rather than alternately as in many multivibrators of the prior art. Also, the ratio of the "on" time to "off" time for the circuit is a function of the time constants in the mutual feedback circuits. Thus the transistors are "on" for a length of time depending upon the time required to discharge the condenser 28 substantially through the series-connected resistors 16 and 30. Also, the transistors are "off" for a length of time depending upon the time required to discharge the condenser 34 through the series-connected resistors 20 and 36. It will be obvious to one skilled in the art that adjustment of these periods of conduction and non-conduction can be made by means of the resistors 30 and 36, by replacing the resistors 16 and 20 with rheostats, or by providing means to vary the capacitances of the condensers 28 and 34.

As in the case of said copending application, it is convenient to take the output signal from the circuit either between the terminals 24 and 26, or between either of these terminals and ground. Tests conducted upon the circuit reveal that waveforms of sharp square-wave shape can be readily obtained through suitable choice of the parameters in accordance with the foregoing description, by application of the techniques of circuit design hitherto practiced in this art.

It will be understood that, while the invention has been described with reference to a specific circuit, certain modifications thereof may be made, such as those hitherto described and others that will suggest themselves to the skilled artisan upon a reading of the foregoing specification; that the invention is therefore by no means specifically limited thereto; and that such modifications are within the spirit and scope of the invention.

Having thus described the invention, I claim:

1. A multivibrator circuit having, in combination, a pair of complementary transistors having a common emitter connection, emitter-collector circuits for the transistors including resistances and bias means of the appropriate polarities for conduction therein, means to bias the emitter-base circuit of one transistor to obtain appreciable current flow in the emitter-collector circuit of the one transistor, means to bias the emitter-base circuit of the other transistor to prevent current flow in the emitter-collector circuit of the other transistor, and a mutual feedback circuit including a condenser between the collector of each transistor and the base of the other transistor.

2. A multivibrator circuit having, in combination, a pair of complementary transistors having a common emitter connection, emitter-collector circuits for the transistors including resistances and bias means of the appropriate polarities for conduction therein, emitter-base circuits for the transistors each including a variable resistance and bias means, said last-mentioned bias means biasing one transistor to obtain appreciable current flow in the emitter-collector circuit of the one transistor and the other transistor to prevent current flow in the emitter-collector circuit of the other transistor, and a mutual feedback circuit including a condenser between the collector of each transistor and the base of the other transistor.

3. A multivibrator circuit having, in combination, a pair of complementary transistors having a common emitter connection, emitter-collector circuits for the transistors including resistances and direct current sources of the appropriate polarities for conduction therein, emitter-base circuits for the transistors each including a variable resistance and a direct current source, one of said last-mentioned direct current sources biasing one transistor to obtain appreciable current flow in the emitter-collector circuit of the one transistor and the other of said last-mentioned direct current sources biasing the other transistor to prevent current flow in the emitter-collector circuit of the other transistor, feedback circuits between the collector of each transistor and the base of the other transistor, each of said feedback circuits including a condenser, and output terminals directly connected to the collector of each transistor.

References Cited in the file of this patent

UNITED STATES PATENTS

| | | |
|---|---|---|
| 2,744,198 | Raisbeck | May 1, 1956 |
| 2,788,449 | Bright | Apr. 9, 1957 |
| 2,812,437 | Sziklai | Nov. 5, 1957 |
| 2,831,113 | Weller | Apr. 15, 1958 |